(12) United States Patent
Daya

(10) Patent No.: US 7,714,456 B1
(45) Date of Patent: May 11, 2010

(54) ROAD VEHICLE ACTUATED ENERGY DEVICE

(76) Inventor: Arvind A. Daya, 839 New Hope Rd., Fayetteville, GA (US) 30214

( * ) Notice: Subject to any disclaimer, the term of this patent is extended or adjusted under 35 U.S.C. 154(b) by 0 days.

(21) Appl. No.: 12/326,346

(22) Filed: Dec. 2, 2008

(51) Int. Cl.
*F02B 63/04* (2006.01)
(52) U.S. Cl. .................................................. 290/1 R
(58) Field of Classification Search ............. 290/1 R; 417/229; 60/325, 398, 668, 533
See application file for complete search history.

(56) References Cited

U.S. PATENT DOCUMENTS

| | | | |
|---|---|---|---|
| 1,238,687 A | 8/1917 | King | |
| 1,771,200 A | 7/1930 | Akers | |
| 1,916,873 A * | 7/1933 | Wiggins | 185/39 |
| 2,333,614 A | 11/1943 | Boyd | |
| 3,892,136 A * | 7/1975 | MacDonald | 74/14 |
| 4,004,422 A * | 1/1977 | Le Van | 60/533 |
| 4,081,224 A | 3/1978 | Krupp | |
| 4,173,431 A * | 11/1979 | Smith | 417/229 |
| 4,238,687 A | 12/1980 | Martinez | |
| 4,239,179 A | 12/1980 | Geier | |
| 4,250,395 A * | 2/1981 | Lundgren | 290/1 R |
| 4,339,920 A | 7/1982 | Le Van | |
| 4,614,875 A | 9/1986 | McGee | |
| 4,849,648 A | 7/1989 | Longardner | |
| 4,980,572 A * | 12/1990 | Sen | 290/1 R |
| 5,634,774 A | 6/1997 | Angel et al. | |
| 5,634,775 A | 6/1997 | Murakami et al. | |
| 6,204,568 B1 | 3/2001 | Runner | |
| 6,353,270 B1 * | 3/2002 | Sen | 290/1 R |
| 6,767,161 B1 * | 7/2004 | Calvo et al. | 404/71 |
| 6,858,952 B2 * | 2/2005 | Gott et al. | 290/1 R |
| 6,936,932 B2 | 8/2005 | Kenney | |
| 7,067,932 B1 | 6/2006 | Ghassemi | |
| 2004/0042852 A1 * | 3/2004 | Alperon | 404/71 |
| 2009/0127865 A1 * | 5/2009 | Valentino | 290/1 R |

* cited by examiner

*Primary Examiner*—Julio Gonzalez
(74) *Attorney, Agent, or Firm*—R. William Graham

(57) ABSTRACT

A road vehicle actuated energy device for use in a path of a vehicle includes an actuator for transverse disposal in a cavity of a road across the path of the vehicle, wherein the actuator includes a bent member having a first end and a second end and when so disposed in the road the first end moves between a first position above the road and a second position below the first position, a rotatable drive shaft, a one-way clutch ring operably connected to the second end of the bent member wherein the one-way clutch ring has an inner opening configured to receive the drive shaft therethrough and engage the drive shaft in a manner to cause one-way rotation thereof when the first end is moved from the first position to the second position and freely releases the drive shaft when moving from the second position to the first position and an energy generator operably connected to the drive shaft in a manner to generate energy upon rotation of the drive shaft.

23 Claims, 4 Drawing Sheets

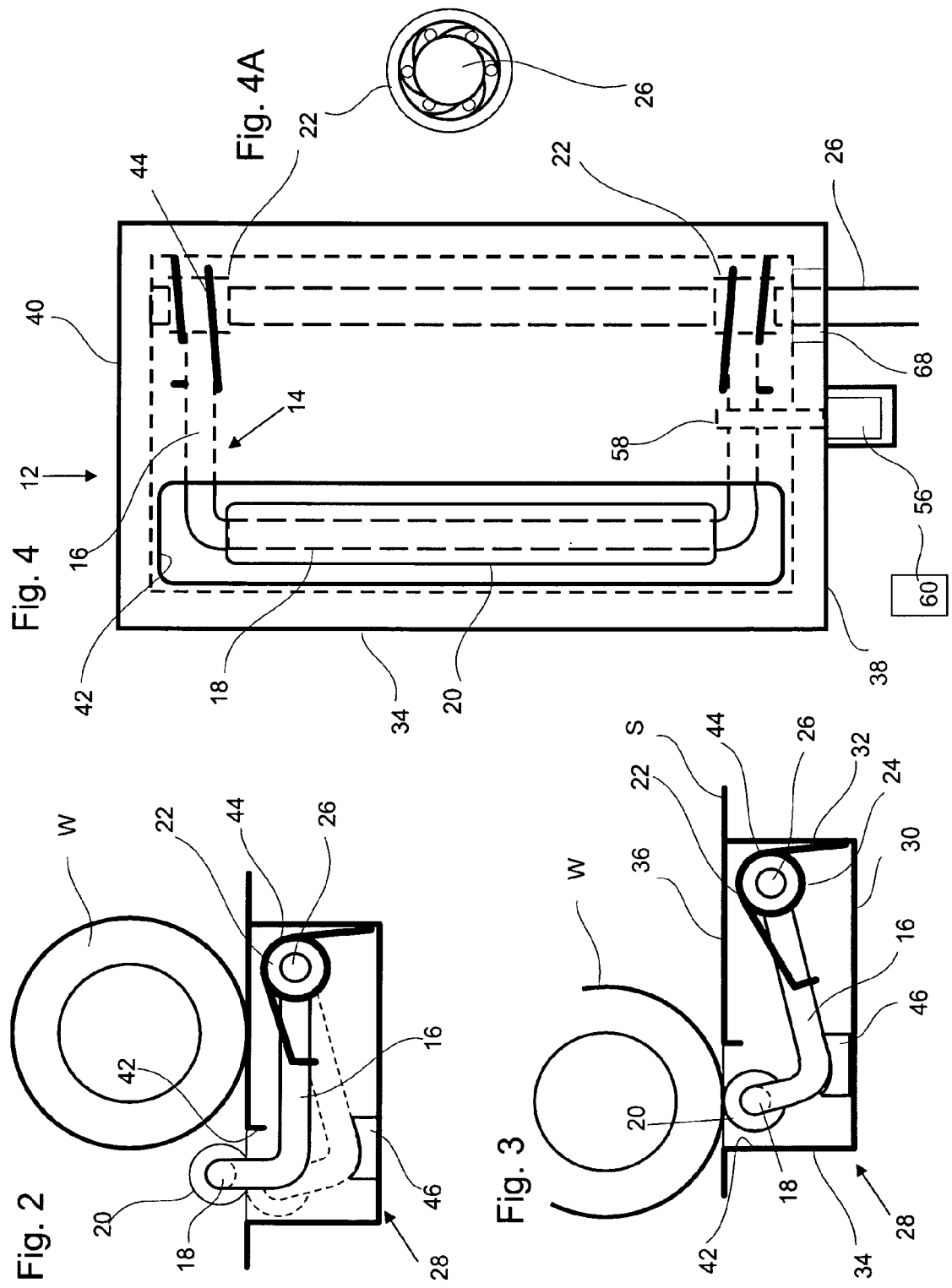

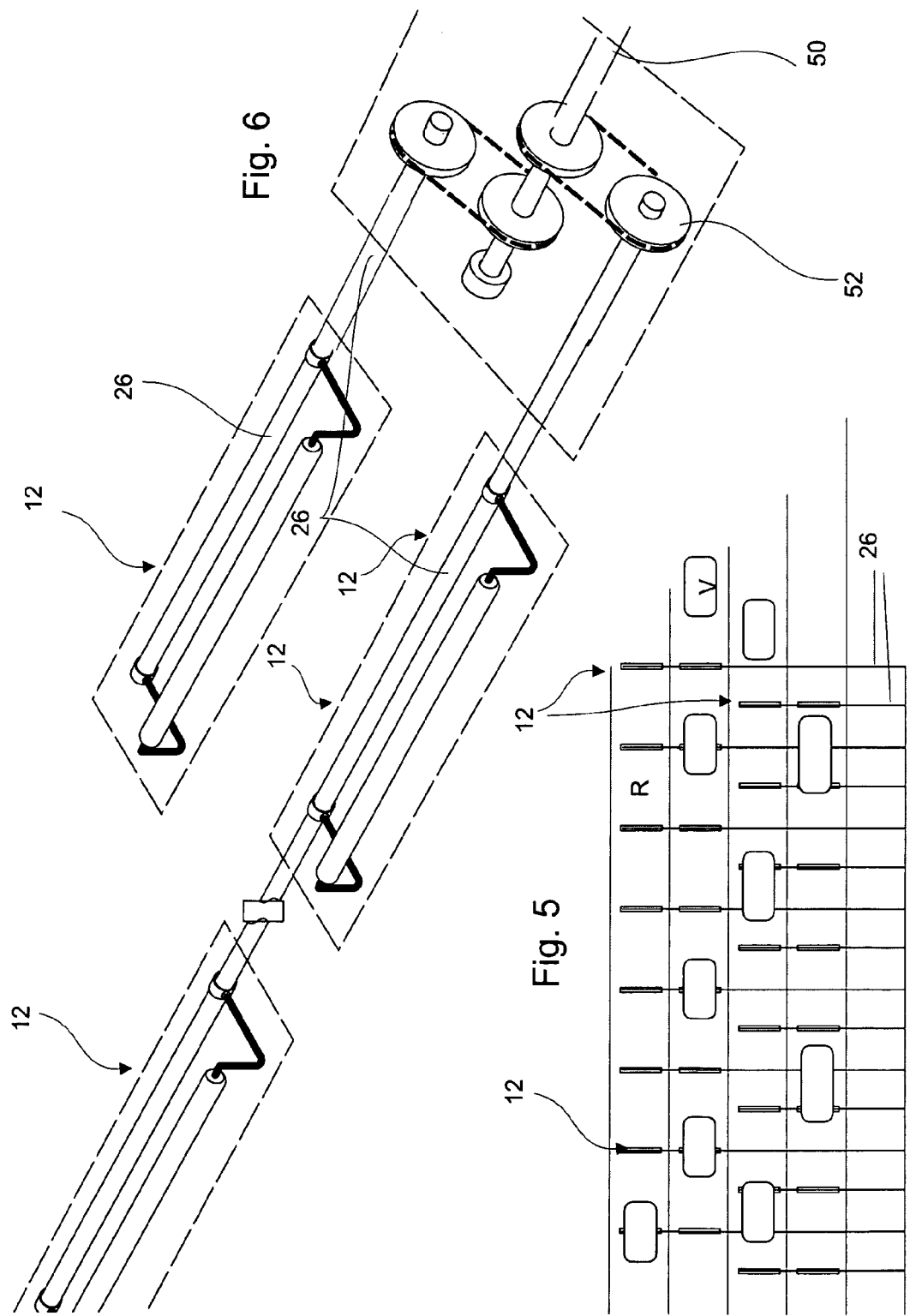

ROAD VEHICLE ACTUATED ENERGY DEVICE

BACKGROUND OF INVENTION

1. Field of Invention

The present invention relates to capturing otherwise wasted energy to perform usable work and energy conservation. More particularly, the invention relates to an improved system for generating power from the movement of vehicles over a roadway.

2. Related Art

There exist numerous prior devices which have attempted to harness the potential energy contained in moving vehicles. Typically, these devices convert the potential energy into kinetic energy for providing useful work by means of pneumatic and/or mechanical means which can be used to run a generator. To date, such systems have failed to be adopted into current roadways. It is contemplated that such systems lack necessary durability, efficiency or both and hence have met resistance in adopting the same.

Nevertheless, there remains an ever increasing need to conserve energy, particularly in countries where automobiles are the primary mode of transportation. Wherever there is a consistent moving stream of traffic, such as highways, toll booths, tunnels, bridges, etc., there remains a significant amount of unused energy which can be tapped to offset current energy demands. Accordingly, the present invention improves upon the art in providing an efficient and low maintenance road vehicle actuated energy device.

SUMMARY OF THE INVENTION

It is a general object of the present invention to capture potential energy for useful purposes.

Another object is to capture energy from moving vehicles through the use of the instant invention.

Still another object of the present invention is to provide an improved device for converting the potential energy developed by a moving vehicle into kinetic energy for performing useful work.

Accordingly, the present invention is directed to a road vehicle actuated energy device for use in a path of a vehicle. The device includes an actuator for transverse disposal in a cavity of a road across the path of the vehicle, wherein the actuator includes a bent member having a first end and a second end and when so disposed in the road the first end moves between a first position above the road and a second position below the first position. A rotatable drive shaft is provided and a one-way clutch ring is operably connected to the second end of the bent member wherein the one-way clutch ring has an inner opening configured to receive the drive shaft therethrough and engage the drive shaft in a manner to cause one-way rotation thereof when the first end is moved from the first position to the second position and freely releases the drive shaft when moving from the second position to the first position. An energy generator is operably connected to the drive shaft in a manner to generate energy upon rotation of the drive shaft.

The device can further include a spring for biasing the first end of the bent member toward the first position. Housing can be provided for at least partially containing the actuator, the housing including a top wall which includes an opening to permit the first end of the bent member to move therethrough and into the first position and the second position wherein the second end is substantially disposed in the housing. A thermal control device can be connected to the housing. Also, cushion member can be provided to receive contact of the first end when in the first position.

Other objects and advantages of the invention will be apparent from reading the description and viewing the drawings herewith.

BRIEF DESCRIPTION OF THE DRAWINGS

FIG. 2 is an enlarged side elevation showing a wheel approaching an actuator of the invention on a road shown in FIG. 1;

FIG. 3 is an enlarged side elevation showing a wheel on an actuator of the invention on a road shown in FIG. 1;

FIG. 4 depicts a top schematic view of the actuator of the invention;

FIG. 4A generally depicts a cross sectional view of a one-way clutch about a drive shaft;

FIG. 5 depicts a road showing a series of transversely mounted devices of the invention;

FIG. 6 depicts interconnection of devices of the invention as depicted in FIG. 5;

DETAILED DESCRIPTION OF PREFERRED EMBODIMENTS

Figure 1:
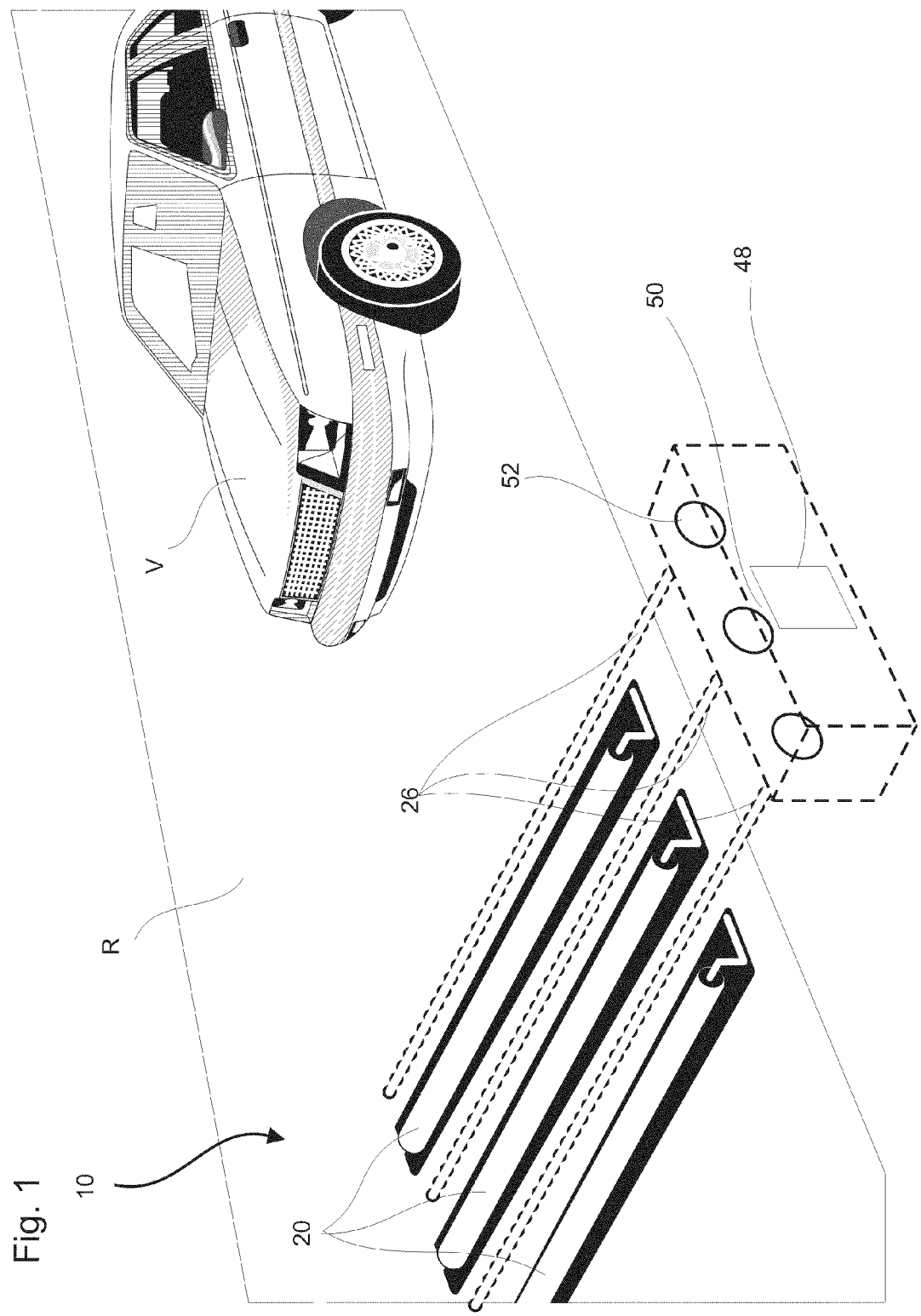
FIG. 1 is a perspective view of a road incorporating the invention.
Figure 8:
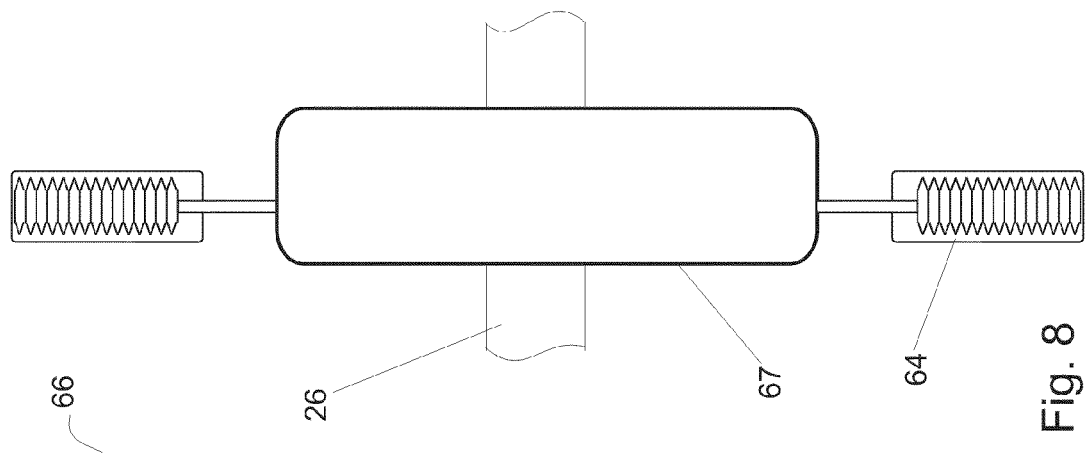
FIG. 8 depicts an end view of FIG. 7.
Figure 7:
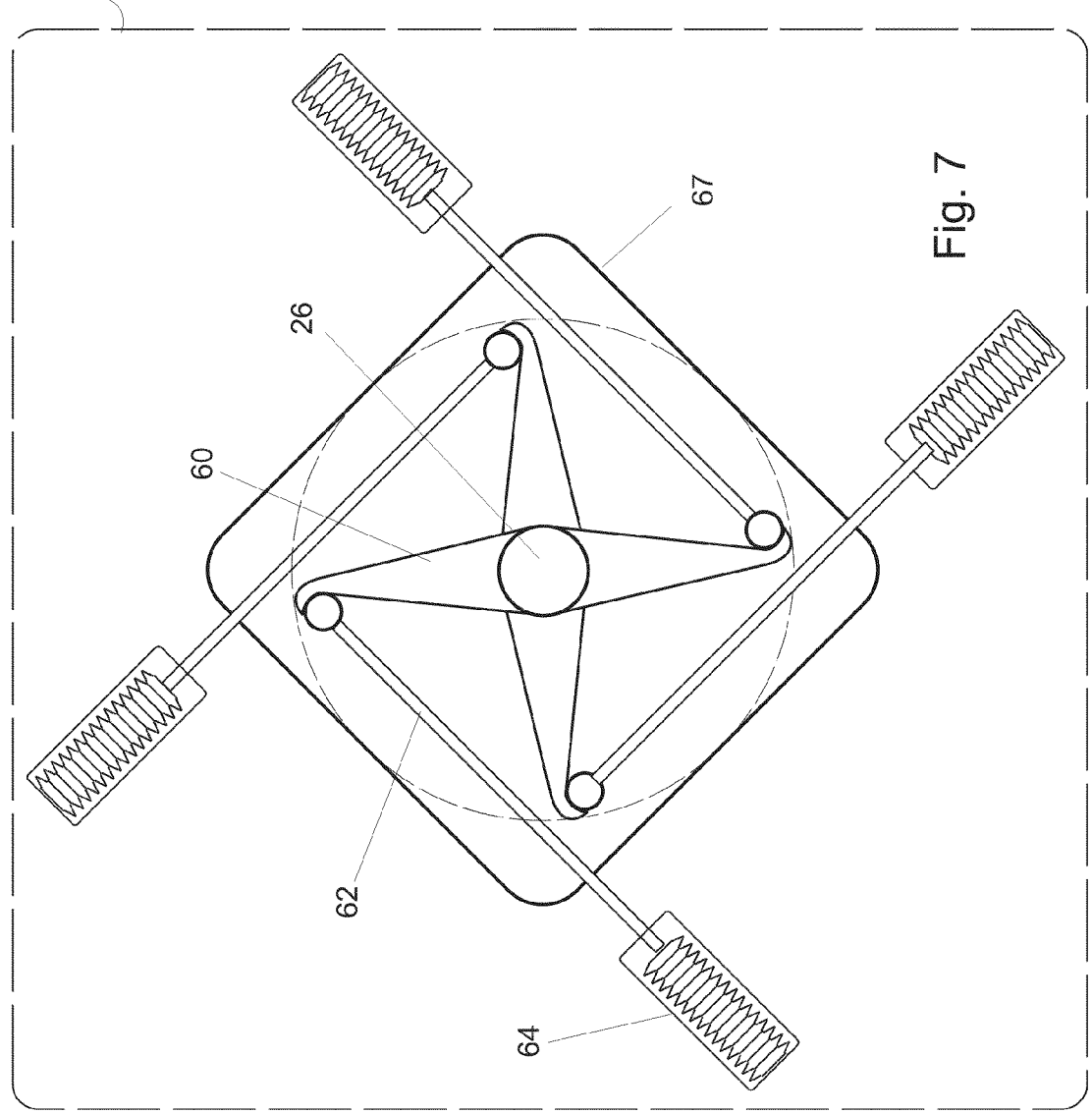
FIG. 7 depicts a side view of another embodiment of the invention.

Referring now to the present invention, the road vehicle actuated energy device is generally designated by the numeral 10. In FIGS. 1-8, there is shown a road R which can have one or more lanes. Operably disposed within road R can be one or more actuators 12 which can be transversely disposed across a path of travel of vehicle V. The actuators 12 can be placed in alignment or offset with respect to one another.

Each actuator 12 can preferably include a generally U shaped bent member 14 including generally L-shaped sides 16 which are interconnected by a transverse member 18. A roller bearing sleeve 20 can be provided over the transverse member 18. A oneway clutch ring 22 rigidly connects to end 24 of each L-shaped side 16 and has an inner opening configured to receive a drive shaft 26 therethrough and engage drive shaft 26 in a manner to cause one-way rotation thereof when the end 24 is moved from a first (up) position to a second (down) position and freely releases said drive shaft 26 when moving from second position to first position. A housing 28 can preferably be provided with a bottom wall 30, side walls 32 and 34, top wall 36 and end walls 38 and 40. Drive shaft 26 can be operably disposed adjacent wall 32 to run lengthwise within the housing 28 and extend out at least one end wall 38 and 40. The top wall 36 includes a longitudinal slotted surface 42 configured to receive transverse member 18 and roller bearing sleeve 20 removably therethrough. The housing 28 can preferably be disposed below the road surface S such that the top wall 36 is substantially coplanar therewith.

The actuator 12 is normally biased upward as seen in FIG. 2 by means of a spring 44 or the like such that the side 16 is normally biased upward adjacent the top wall 36 and the roller bearing sleeve 20 and the transverse member 18 extend through the slotted surface 42 (up position). A cushion member 46, such as a rubber stop, can be provided adjacent the bottom wall 30 to enable contact of the actuator 12 when pivoted thereagainst (down position).

Thus, as a wheel W moves from a first position out of contact with the actuator 12 where the transverse member 18 and roller bearing sleeve 20 extend above the road surface S as seen in FIG. 3 to a second position in contact with the actuator 12 where transverse member 18 and roller bearing sleeve 20 are below the road surface S as seen in FIG. 3, there is a highly efficient transfer of energy from the Wheel W to the actuator 12 to drive shaft 26 through the one-way clutch ring 22. The drive shaft 26 can be operably connected to an electrical turbine generator 48 which can be disposed adjacent the road R.

There can be a plurality of actuators 12 disposed in respective housings 28 which can be aligned in tandem relation. In this regard, parallel drive shafts 26 can be operatively connected to a central drive shaft 50 by gears and one-way clutch mechanism 52 such that the central drive shaft 50 can be turned through the aid of each drive shaft 26 and without regard to impact synchronization of the actuators 12. In the case of intersection I, drive shafts 26 may be interconnected to a central drive shaft 50 at an angle such as 90 degrees using a bevel gearing and one way clutch mechanism (not shown).

The present invention provides for a highly efficient and durable device 10 which requires minimal service or maintenance. Further, the design provides for all weather use which is less susceptible to breakdown, clogging or jamming. In highly inclement weather, the device 10 provides for locking the actuators 12 in the down position via a locking pin mechanism 56 which can removably extend its pin 58 across the side 16 to hold the actuator 12 down. This locking pin mechanism 56 can be remotely controlled by a processor 60. The housing 28 can preferably be removably received within a groove of the road R and can include one or more drain openings (not shown) and a thermal control element, such as a heater. Thus, the device 10 is equipped to handle the weather related elements without posing a risk to drivers.

It is also contemplated that the drive shaft 26 could alternatively be connected to a plurality of arms 60 which are operably connected to piston shafts 62 of air pistons 64 as seen in FIG. 6 all of which can be within a housing 66. In this way, as the drive shaft 26 rotates, the pistons 64 reciprocate. The arms 60 and piston shafts 62 can be operably disposed in housing 67.

Each drive shaft 26 or 50 can be rotatably supported within bearings (not shown) contained in a support mount 68. It is understood that the drive shaft 26 or 50 can be connected by any suitable means to generator 48 which in turn is connected to any power line or storage or hydrogen producing system.

By virtue of the instant invention, there is provided a device which can more realistically reduce our dependency on natural resource energy and stretch the life of such resources into the generations to come. Additionally, hydrogen can be generated with the generated energy which can be used in vehicles of the future as well as utility demands.

It is to be understood that the foregoing description provides an example of the embodiments contemplated herein and those skilled in the art will grasp modifications, derivations and improvements without departing from the principles of the present invention. The claims should therefore not be limited thereto but be afforded the scope of such modifications, derivations and improvements.

What is claimed is:

1. A road vehicle actuated energy device for use in a path of a vehicle, which includes:
an actuator for transverse disposal in a cavity of a road across the path of the vehicle, wherein said actuator includes a bent member having a first end and a second end and when so disposed in the road said first end moves between a first position above the road and a second position below the first position, a rotatable drive shaft, a one-way clutch ring operably connected to said second end of said bent member wherein said one-way clutch ring has an inner opening configured to receive said drive shaft therethrough and engage said drive shaft in a manner to cause one-way rotation thereof when said first end is moved from said first position to said second position and freely releases said drive shaft when moving from said second position to said first position and wherein said bent member is further characterized to include a generally U shaped bent arm including generally L shaped sides interconnected by a transverse member; and
an energy generator operably connected to said drive shaft in a manner to generate energy upon rotation of said drive shaft.

2. The road vehicle actuated energy device of claim 1, wherein said second position is characterized to be proximate below the road.

3. The road vehicle actuated energy device of claim 1, which further includes a spring for biasing said first end of said bent member toward said first position.

4. The road vehicle actuated energy device of claim 1, which includes a housing for at least partially containing said actuator, said housing including a top wall which includes an opening to permit said first end of said bent member to move therethrough and into said first position and said second position wherein said second end is substantially disposed in said housing.

5. The road vehicle actuated energy device of claim 4, which includes a thermal control device operably connected to said housing.

6. The road vehicle actuated energy device of claim 1, which includes a roller bearing sleeve disposed on said transverse member.

7. The road vehicle actuated energy device of claim 6, which includes a housing for at least partially containing said actuator, said housing including a top wall which includes a longitudinal slotted surface configured to receive transverse member and roller bearing sleeve removably therethrough.

8. The road vehicle actuated energy device of claim 1, which includes a cushion member to receive contact of said first end when in said first position.

9. The road vehicle actuated energy device of claim 1, which includes a plurality of said actuators operable connected to said energy generator.

10. The road vehicle actuated energy device of claim 9, wherein said actuators are in tandem relationship to each other.

11. The road vehicle actuated energy device of claim 9, wherein said actuators are in one of aligned and offset position with respect to one another relative to the path.

12. A road vehicle actuated energy device for use in a path of a vehicle, which includes:
an actuator for transverse disposal in a cavity of a road across the path of the vehicle, wherein said actuator includes a bent member having a first end and a second end and when so disposed in the road said first end moves between a first position above the road and a second position below the first position, a rotatable drive shaft, a one-way clutch ring operably connected to said second end of said bent member wherein said one-way clutch ring has an inner opening configured to receive said drive shaft therethrough and engage said drive shaft in a manner to cause one-way rotation thereof when said first end is moved from said first position to said second position and freely releases said drive shaft when moving from said second position to said first position;

an energy generator operably connected to said drive shaft in a manner to generate energy upon rotation of said drive shaft; and a locking member for locking said first end of said bent member in said second position.

13. A road vehicle actuated energy device for use in a path of a vehicle, which includes:

an actuator for transverse disposal in a cavity of a road across the path of the vehicle, wherein said actuator includes a bent member having a first end and a second end and when so disposed in the road said first end moves between a first position above the road and a second position below the first position, a rotatable drive shaft, a one-way clutch ring operably connected to said second end of said bent member wherein said one-way clutch ring has an inner opening configured to receive said drive shaft therethrough and engage said drive shaft in a manner to cause one-way rotation thereof when said first end is moved from said first position to said second position and freely releases said drive shaft when moving from said second position to said first position; and an energy generator operably connected to said drive shaft in a manner to generate energy upon rotation of said drive shaft, a housing for at least partially containing said actuator and a thermal control device operably connected to said housing.

14. The road vehicle actuated energy device of claim 13, which further includes a spring for biasing said first end of said bent member toward said first position.

15. The road vehicle actuated energy device of claim 13, said housing at least partially containing said actuator, said housing including a top wall which includes an opening to permit said first end of said bent member to move therethrough and into said first position and said second position wherein said second end is substantially disposed in said housing.

16. The road vehicle actuated energy device of claim 13, wherein said bent member is further characterized to include a generally U shaped bent arm including generally L shaped sides interconnected by a transverse member.

17. The road vehicle actuated energy device of claim 16, which includes a roller bearing sleeve disposed on said transverse member.

18. The road vehicle actuated energy device of claim 17, said housing including a top wall which includes a longitudinal slotted surface configured to receive said transverse member and said roller bearing sleeve removably therethrough.

19. The road vehicle actuated energy device of claim 13, which includes a locking member for locking said first end of said bent member in said second position.

20. The road vehicle actuated energy device of claim 13, which includes a cushion member to receive contact of said first end when in said first position.

21. The road vehicle actuated energy device of claim 13, which includes a plurality of said actuators operable connected to said generator.

22. The road vehicle actuated energy device of claim 21, wherein said actuators are in tandem relationship to each other.

23. The road vehicle actuated energy device of claim 13, wherein said second position is characterized to be proximate below the road.

* * * * *